(12) United States Patent
Mullet et al.

(10) Patent No.: US 8,854,798 B1
(45) Date of Patent: Oct. 7, 2014

(54) TRANSMITTER HOLDER APPARATUS AND METHOD

(75) Inventors: Willis Jay Mullet, Gulf Breeze, FL (US); Christopher Lee Wysoczynski, Gulf Breeze, FL (US); Darrin W. Brunk, Pensacola, FL (US)

(73) Assignee: Qmotion Incorporated, Pensacola, FL (US)

( * ) Notice: Subject to any disclaimer, the term of this patent is extended or adjusted under 35 U.S.C. 154(b) by 397 days.

(21) Appl. No.: 12/587,140

(22) Filed: Oct. 2, 2009

(51) Int. Cl.
*H05K 5/00* (2006.01)
*H05K 7/00* (2006.01)

(52) U.S. Cl.
USPC .................................. 361/679.01; 175/50

(58) Field of Classification Search
CPC .............................. H01H 9/025; A47H 5/0325
USPC ........................................ 361/679.01; 174/50
See application file for complete search history.

(56) References Cited

U.S. PATENT DOCUMENTS

| | | | |
|---|---|---|---|
| 4,815,683 A * | 3/1989 | Ferrante ...................... 248/205.2 |
| D322,244 S * | 12/1991 | Bishai ............................ D13/168 |
| 5,082,229 A * | 1/1992 | Dahl ............................. 248/444.1 |
| 5,244,173 A * | 9/1993 | Kulyk .......................... 248/176.1 |
| 5,264,761 A | 11/1993 | Johnson |
| 5,316,249 A * | 5/1994 | Anderson ...................... 248/146 |
| 5,341,941 A * | 8/1994 | Marlor ........................... 211/26.1 |
| 5,458,311 A | 10/1995 | Holbrook |
| 5,603,451 A * | 2/1997 | Helander et al. ................. 236/51 |
| 5,648,757 A * | 7/1997 | Vernace et al. ............ 340/539.32 |
| 5,790,021 A * | 8/1998 | Mickel et al. ............ 340/539.32 |
| 6,085,826 A * | 7/2000 | Maesaki ......................... 160/345 |
| 6,305,656 B1 * | 10/2001 | Wemyss ...................... 248/309.4 |
| 6,320,503 B1 * | 11/2001 | Dunn et al. ............... 340/539.32 |
| 6,355,885 B1 | 3/2002 | Rintz et al. |
| 6,522,078 B1 | 2/2003 | Okamoto et al. |
| 6,598,652 B1 * | 7/2003 | Montesinos ................... 160/331 |
| 6,603,644 B2 * | 8/2003 | Yeh ................................... 361/31 |
| 6,751,486 B1 * | 6/2004 | Guillot et al. ................... 455/573 |
| 6,769,658 B2 * | 8/2004 | Stokes .......................... 248/309.1 |
| 6,816,713 B2 * | 11/2004 | Chen ............................. 455/90.3 |
| 6,922,333 B2 * | 7/2005 | Weng et al. ................. 361/679.2 |
| 6,967,565 B2 | 11/2005 | Lingemann |
| 6,983,126 B1 * | 1/2006 | Saalman ........................ 455/66.1 |
| D522,999 S * | 6/2006 | Smith-Adams et al. ...... D14/191 |
| 7,071,836 B2 * | 7/2006 | Baud et al. .................. 340/12.22 |
| 7,079,045 B2 * | 7/2006 | Baud et al. .................. 340/12.22 |
| 7,187,283 B2 * | 3/2007 | Leyden et al. ............... 340/568.1 |
| 7,284,791 B1 * | 10/2007 | Wright ....................... 297/188.18 |
| 7,372,355 B2 | 5/2008 | Agronin et al. |
| 7,499,261 B2 * | 3/2009 | Hash ............................... 361/625 |
| 7,639,907 B2 * | 12/2009 | Elberbaum ...................... 385/24 |
| 7,642,912 B2 * | 1/2010 | Sholem ..................... 340/539.32 |
| 7,723,939 B2 * | 5/2010 | Carmen, Jr. .................... 318/466 |
| 7,864,500 B2 * | 1/2011 | Elberbaum .................... 361/170 |
| 2002/0105763 A1* | 8/2002 | Yeh ................................. 361/31 |

(Continued)

FOREIGN PATENT DOCUMENTS

EP 482252 A1 * 4/1992 ................ E06B 9/32

*Primary Examiner* — Adrian S Wilson
(74) *Attorney, Agent, or Firm* — Zarley Law Firm, P.L.C.

(57) ABSTRACT

A transmitter holder apparatus includes a bezel with a front surface, sides and a flat back where the front surface includes a recess A transmitter assembly is provided where the transmitter assembly is configured to fit within the recess in the front surface of the bezel. A connector device is provided for removably connecting the transmitter assembly with the bezel.

18 Claims, 4 Drawing Sheets

(56) References Cited

U.S. PATENT DOCUMENTS

| | | |
|---|---|---|
| 2004/0070516 A1* | 4/2004 | Nielsen .................... 340/825.72 |
| 2005/0034374 A1* | 2/2005 | Ebbe et al. ...................... 49/325 |
| 2005/0168338 A1* | 8/2005 | Parker et al. ............. 340/539.32 |
| 2006/0250764 A1* | 11/2006 | Howarth et al. .............. 361/683 |
| 2007/0035917 A1* | 2/2007 | Hotelling et al. ............. 361/683 |
| 2007/0279245 A1* | 12/2007 | Sholem .................... 340/825.49 |
| 2008/0232061 A1* | 9/2008 | Wang et al. .................... 361/686 |
| 2009/0103228 A1* | 4/2009 | Elderbaum ................... 361/187 |
| 2009/0121842 A1* | 5/2009 | Elberbaum ................. 340/10.5 |
| 2009/0193717 A1* | 8/2009 | Ebbe et al. ....................... 49/324 |

\* cited by examiner

TRANSMITTER HOLDER APPARATUS AND METHOD

FIELD OF THE INVENTION

This invention relates to a transmitter holder apparatus and method. In particular, in accordance with one embodiment, the invention relates to a bezel with a front surface, sides and a flat back where the front surface includes a recess. A transmitter assembly is provided where the transmitter assembly is configured to fit within the recess in the front surface of the bezel. A connector device is provided for removably connecting the transmitter assembly with the bezel.

BACKGROUND OF THE INVENTION

Ease of use of modern day appliances requires that the systems used to control the operation of the appliances be accessible in predictable locations. As more and more appliances are added to a structure, the number of control devices multiplies rapidly and the difficulty in locating the appropriate control from the increasing clutter of individual controls is a real and frustrating problem in modern homes and offices.

By way of example only, controls for televisions, music systems, ceiling fans, lighting systems, window shades, door coverings and curtains are all known to include control devices for remote control and operation. Where any one of the controls are to be found at any one time is typically anyone's guess, however. A series of inventions have addressed the problem of locating the remote controls including audio and visual displays. These "solutions", however, create additional problems of how to locate the locator.

Applicants are also aware of a variety of devices that utilize electrical switch boxes as the source of power for the device and to which operational controls are connected. Johnson, U.S. Pat. No. 5,264,761, requires the addition of a modified on-off switch to a common electrical switch box and connection with the electrical power source located in the box for operation of a lamp control module. This device requires the modification of and use of the common electrical switch box power connections for operation. Similarly, Rintz et al., U.S. Pat. No. 6,355,885, discloses an add on light switch cover for use with conventional "rocker or tactile" and "toggle" type switches that uses, and requires, the fully operational capabilities of a common electrical switch and switch box in order to function.

A variety of remote control systems are known that are complex and expensive. Okamoto et al., U.S. Pat. No. 6,522,078, utilizes an infrared detection system to detect thermal energy from a human to activate. Lingemann, U.S. Pat. No. 6,967,565, is a complete building automation system including user interface units with touch screens, power drivers, wireless remote controls and a controller all connected to a common trunk conductor. Agronin et al., U.S. Pat. No. 7,372,355, is a device for actuating a switch that requires use and modification of a wall mounted light switch. Hollbrook, U.S. Pat. No. 5,458,311, is similar in that it uses an active, operational wall mounted light switch. A wireless wall mount is connected on top of an existing wall switch to receive and support a wireless remote control. The mounting structure completely covers the existing switch and thus requires a recess to receive the existing switch used for turning the switch on and off. Further, the wireless remote extends from the mounting structure so that the user may grasp the sides to pull it from, and replace it with, the mount. The mounting structure and remote thus extend significantly away from the existing wall switch in an intrusive, invasive, manner and generally add a cluttered appearance to the wall switch.

While the location of prior art transmitters at common wall switch locations is known, what is missing is an apparatus and method for utilizing the location of the wall switch without requiring the use of, or interference with, the switch itself or requiring power to be run to the switch and/or utilized at all. Further, there is a need in the art for providing an apparatus and method for locating remote transmitters that is unobtrusive, that is not bulky or invasive and that presents a useful in place interface while at the same time being easily accessible and removable for use away from the wall switch location.

It, therefor, is an object of this invention to provide an apparatus and method of using common wall switch locations at expected locations within a structure for location of a transmitter holder. It is a further object to provide a device that does not require the use of power from the switch box location and yet that can be used as a wall switch and/or removed and used to operate an appliance. It is a further object that it be easy to install and use and does not require the use or alteration of the existing switch box. It is a further object to provide a device that is similar in appearance to existing switch box covers and that does not intrude or extend into the space surrounding the switch box any more than existing switch box covers.

SUMMARY OF THE INVENTION

Accordingly, the transmitter holder apparatus of the present invention, according to one embodiment includes a bezel with a front surface, sides and a flat back where the front surface includes a recess. A transmitter assembly is provided where the transmitter assembly is configured to fit within the recess in the front surface of the bezel. A connector device is provided for removably connecting the transmitter assembly with the bezel.

In another aspect, the connector device includes a metal plate and a magnet in cooperative relationship such that the magnet removably connects with the metal plate. In one aspect, the metal plate is connected with the bezel in the recess and the recess includes a base and the metal plate extends out from the recess base. In a further aspect, the magnet is connected with the transmitter assembly and the transmitter assembly includes a chamber such that the metal plate fits within the chamber in the transmitter assembly.

In one aspect, the transmitter assembly includes an operating surface and the operating surface of the transmitter assembly extends above the front surface of the bezel when the transmitter assembly is connected with the bezel. In another aspect, the transmitter assembly includes controls for operation of a device in an operating surface of the transmitter assembly. In a further aspect, the device is a curtain assembly. In another aspect, the controls control movement of a curtain assembly such that a shade moves up and down. In one aspect, the controls control movement of a curtain assembly such that a shade moves up and down a percentage of a total distance.

According to another aspect of the invention, the connector device is asymmetrical such that the transmitter assembly is always connected with the bezel in only one particular orientation. As used herein, the term "asymmetrical" is given its common meaning such that it is clear that what is meant is that, according to one embodiment, the connector device has a particular location within the recess of the bezel and on the transmitter assembly that prevents the transmitter assembly from being connected with the bezel upside down, for example only.

According to another embodiment, a transmitter holder apparatus includes a bezel with a front surface, sides and a back where the front surface includes a recess. A transmitter assembly for operation of an appliance is provided where the transmitter assembly includes controls for operation of the appliance and where the transmitter assembly includes a power source and where the transmitter assembly is configured to fit within the recess in the front surface of the bezel. A connector device for removably connecting the transmitter assembly with the bezel is provided where the connector device includes a metal plate and a magnet in cooperative relationship such that the magnet removably connects with the metal plate.

In another aspect, the recess in the front surface of the bezel extends beyond the back of the bezel. In a further aspect, the recess in the bezel is conformed to fit within an electrical switch box.

As used herein, the term electrical "switch box" is used with its common meaning as understood by those of ordinary skill in the art. That is, it is used to denote a common switch box which is built to contain the elements of an electrical switch used to turn an appliance on or off. Common electrical switches include a toggle switch, for example only and not by way of limitation, movable up and down. Such electrical switches are hardwired to the appliance or an electrical outlet to which an appliance is connected. The switch box, thus, is the box within which the electrical power connections and electrical switch components are located. Still further, the switch box is typically attached to a supporting stud or beam behind a wall with an open part of the switch box facing toward an access opening in the wall. Further, commonly the finished electrical switch box and switch includes a cover plate that lays flats against the wall surface and covers the switch box opening and components within the switch box from view.

In another aspect of the invention, the transmitter assembly includes a removal assist device. In one aspect, the removal assist device includes a cut out in the transmitter assembly.

In a further aspect, the appliance is a curtain assembly and the curtain assembly includes a shade for covering an opening and the controls control operation of the curtain assembly such that the shade moves up to an upper limit and down to a lower limit. In another aspect, the appliance is a curtain assembly and the curtain assembly includes a shade for covering an opening and the controls include a first control, a second control and a third control and the first control controls movement of the curtain assembly such that approximately twenty-five per-cent of an opening is covered by the shade, the second control controls movement of the curtain assembly such that approximately fifty per-cent of an opening is covered by the shade and the third control controls movement of the curtain assembly such that approximately seventy-five per-cent of an opening is covered by the shade. According to another aspect, the connector device is asymmetrical such that the transmitter assembly can only be connected with the bezel in one particular orientation.

According to another embodiment of the invention, a transmitter holder method for utilizing a transmitter includes the steps of: providing a bezel with a front surface, sides and a flat back where the front surface includes a recess; providing a transmitter assembly for operation of an appliance where the transmitter assembly includes controls for operation of the appliance and where the transmitter assembly includes a power source and where the transmitter assembly is configured to fit within the recess in the front surface of the bezel; providing a connector device for removably connecting the transmitter assembly with the bezel where the connector device includes a metal plate and a magnet in cooperative relationship such that the magnet removably connects with the metal plate; and placing the transmitter assembly with the bezel such that the metal plate and the magnet hold the transmitter assembly in connection with the bezel.

In one aspect, the metal plate is connected with the bezel and the magnet is connected with the transmitter assembly. In another aspect, the appliance is a curtain assembly and the curtain assembly includes a shade for covering an opening and the controls control operation of the curtain assembly such that the shade moves up to an upper limit and down to a lower limit. In a further aspect, the appliance is a curtain assembly and the curtain assembly includes a shade for covering an opening and the controls include a first control, a second control and a third control and the first control controls movement of the curtain assembly such that approximately twenty-five per-cent of an opening is covered by the shade, the second control controls movement of the curtain assembly such that approximately fifty per-cent of an opening is covered by the shade and the third control controls movement of the curtain assembly such that approximately seventy-five per-cent of an opening is covered by the shade.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
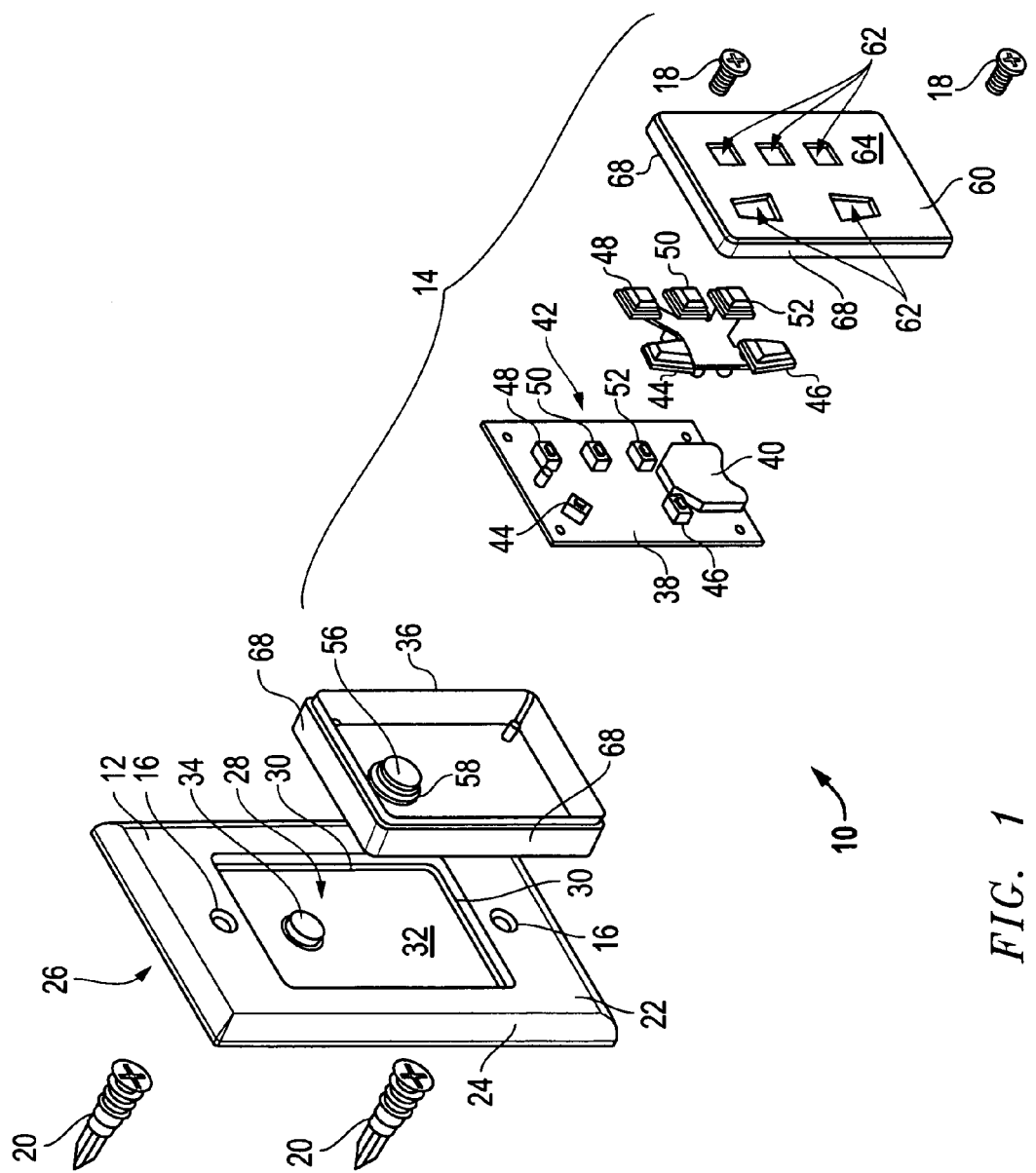
FIG. 1 is an exploded view of the transmitter holder apparatus according to one embodiment.

The preferred embodiment of the present invention is illustrated by way of example in FIGS. 1-6. With specific reference to FIG. 1, the transmitter holder apparatus 10 according to one embodiment includes a bezel 12 and a transmitter assembly 14. Bezel 12 includes openings 16. Screws 18 pass through openings 16 and connect bezel 12 with wall inserts 20. Wall inserts 20 are screwed or hammered into a wall (not shown) and provide a gripping material into which screws 18 are driven, as is known in the art. Wall inserts 20 may be placed at any location on a surface and, therefore, bezel 12 may be located as and where needed or most convenient to the user.

Preferably, bezel 12 includes a front surface 22, sides 24 and back 26. The sides 24 are raised sides as shown in the manner of typical wall switch cover plates known in the art. The back 26 in this embodiment is flat. Thus, when secured in place on a wall, bezel 12 lays flat against the surface of the wall and the front surface 22 extends outwardly from the wall the width of sides 24.

Importantly, recess 28 in the front surface 22 of bezel 12 is provided. Recess 28 includes sides 30 that extend below or into front surface 22. Preferably, a base 32 connected with sides 30 and base 32 is a flat surface parallel to the front surface 22. This feature results in the creation of a uniform and unobtrusive appearance when transmitter assembly 14 is removed. Also preferably, base 32 includes metal plate 34. Metal plate 34 can be any ferrous metal such as steel, for example only, or material to which magnets are attracted.

Transmitter assembly 14 includes a back case 36, a printed circuit board 38, battery 40 and controls 42. Controls 42 include buttons 44, 46, 48, 50, and 52, as will be discussed more fully hereafter with regard to FIG. 4, for controlling a device or appliance 54 (shown in FIG. 4).

Preferably, transmitter assembly 14 includes a magnet 56 connected to back case 36. Preferably, back case 36 includes a chamber 58. Chamber 58 is conformed to receive metal plate 34. That is, metal plate 34 forms a "male" member protruding from the base 32 of recess 28 as shown. Chamber 58 then forms a "female" receiver for metal plate 34. Thus, even without the force of magnetic attraction, transmitter assembly 14 is connected with bezel 12. In the preferred embodiment, however, magnet 56 cooperates with metal plate 34 to removably hold transmitter assembly 14 in place in the recess 28 of bezel 12.

Figure 6:
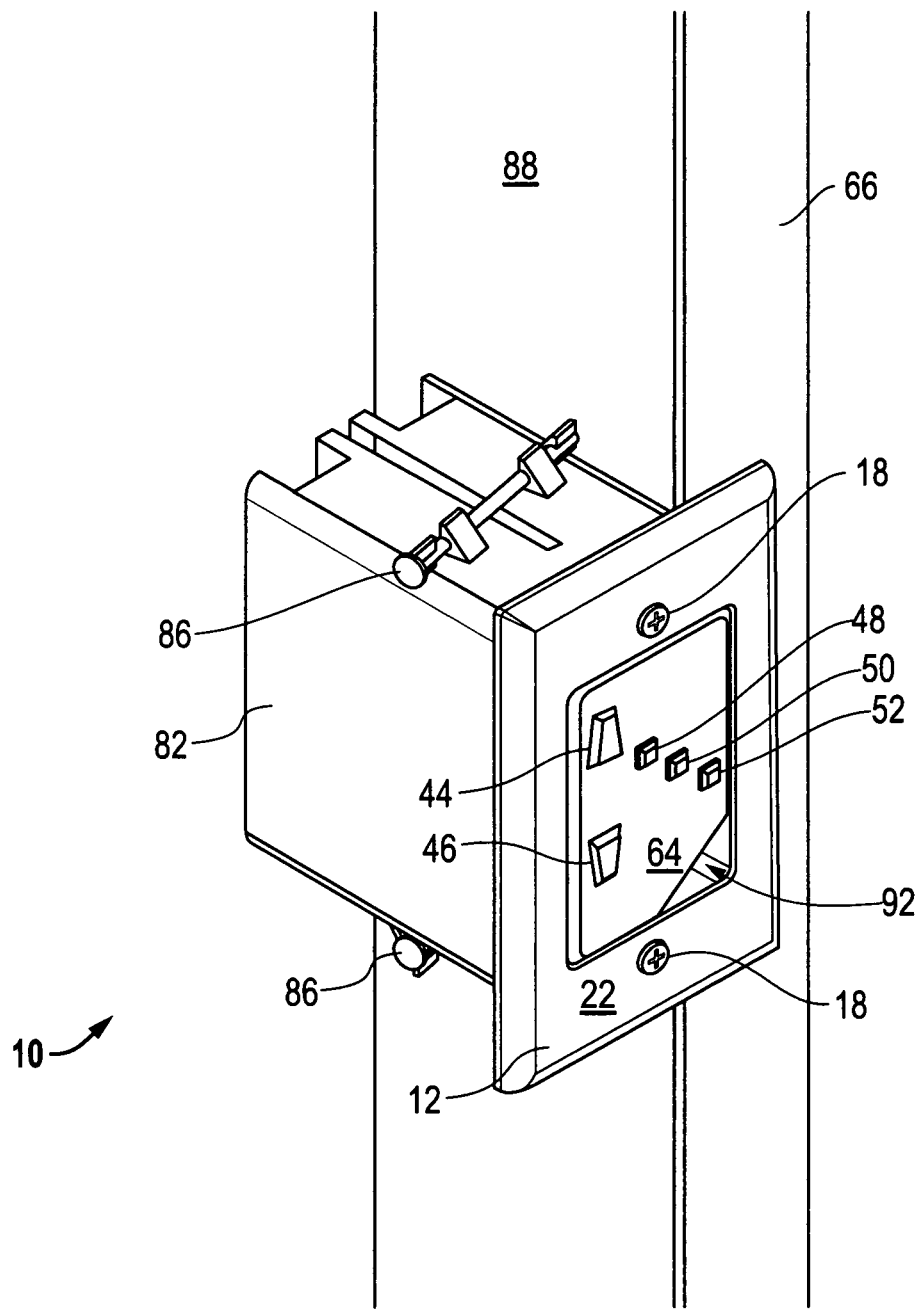
FIG. 6 is a perspective view of the invention of FIG. 5 with the transmitter connected with the bezel and flush with the surface of the bezel.

Transmitter assembly 14 further includes a front cover 60. Front cover 60 connects with back case 36 enclosing printed circuit board 38, battery 40, and controls 42 between them. Front cover 60 includes holes 62 through which buttons 44, 46, 48, 50 and 52 protrude as shown in FIGS. 2, 3, and 6.

FIG. 1 also illustrates another aspect of the invention in which the connector device is asymmetrical. That is, according to this aspect, the metal plate 34, for example only, is located off center with regard to the area defined by recess 28. As shown, for example only, FIG. 1 illustrates the metal plate 34 located above the mid point of recess 28. By the required alignment of the magnet 56 and chamber 58, transmitter assembly 14 can be connected with bezel 12 within recess 28 in only one orientation. This solves a common problem of attaching the transmitter assembly upside down inadvertently.

Figure 2:
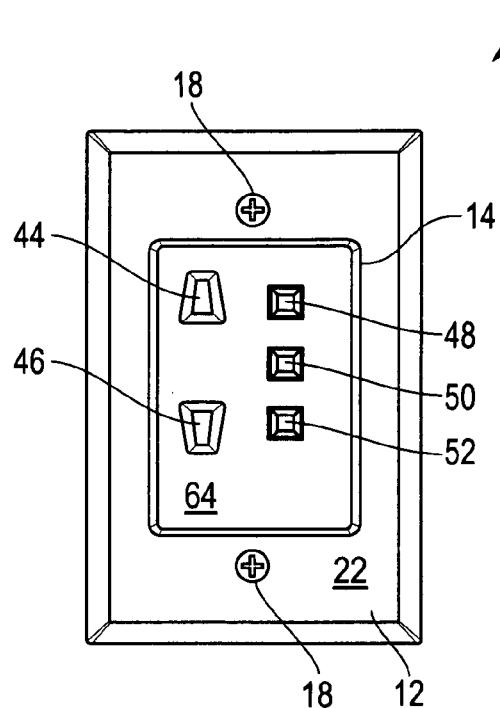
FIG. 2 is a front view of the invention of FIG. 1 with a transmitter connected with the bezel.
Figure 3:
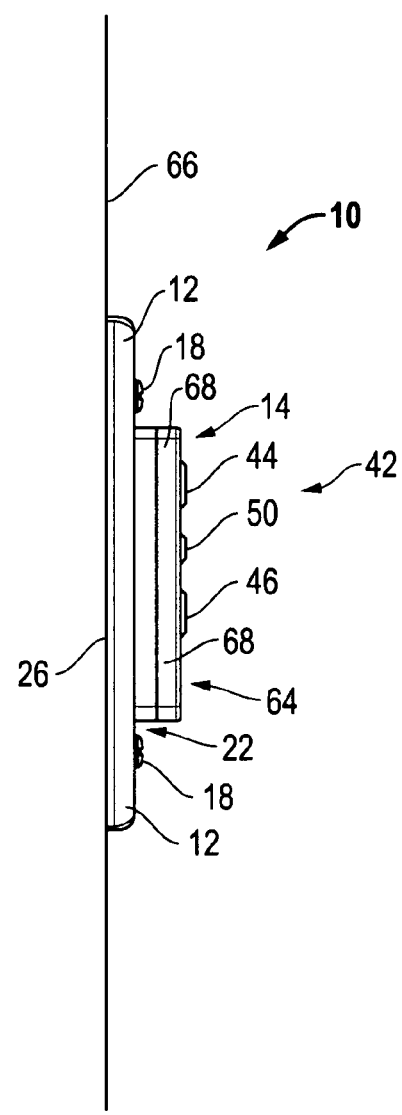
FIG. 3 is a side view of the invention of FIG. 1 with a transmitter connected with the bezel.

Referring now to FIGS. 2 and 3, transmitter assembly 14 is shown connected with bezel 12. It is illustrated that, preferably, recess 28 (not shown) is formed to fit transmitter assembly 14 in length and width and to receive some part of the depth of transmitter assembly 14, some of the back case 36, within recess 28. The back of back case 36 (not shown) is flat as well and meets up with and matches the base 32 of recess 28. Thus the recess 28 is filled by the transmitter assembly 14 or part thereof. In another embodiment, the surface 64 of front cover 60 is flush with the front surface 22 of bezel 12 as will be discussed more fully hereafter with regard to FIG. 6.

In the embodiment shown in FIGS. 2 and 3, back 26 of bezel 12 is flat and thus conforms to the flat surface of wall 66 as shown. In this embodiment, recess 28 in bezel 12 is only as deep, therefor, as the width of sides 24. Nonetheless, this allows bezel 12 to be placed anywhere on any wall 66 the user finds useful and convenient and whether or not an electrical switch box is present. Further, transmitter assembly 14 does not extend excessively into the surrounding space as some portion of the transmitter assembly 14 is within recess 28 as the surface 64 of front cover 60 of transmitter assembly 14 is flat and rests in parallel relation with the front surface 22 of bezel 12. In this embodiment, the sides 68 of transmitter assembly 14, made up of the combination of back case 36 and front cover 60, protrude just enough however to enable a user to grasp transmitter assembly 14 and pull it from its connection with bezel 12. The user is then free to take the transmitter assembly 14 wherever needed and then, by placing the transmitter assembly 14 near bezel 12 and recess 28 enable the magnet 56 metal plate 34 combination to secure it in place.

Figure 4:
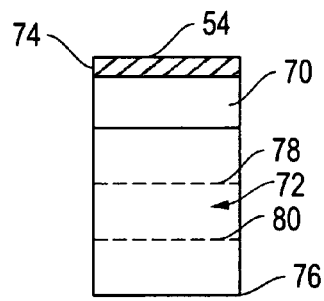
FIG. 4 is a front view of an opening with a curtain assembly with a shade lowered for twenty-five per-cent coverage of the opening, and using dotted lines to indicate fifty per-cent coverage and seventy-five per-cent coverage of the opening.

Referring now to FIG. 4, an appliance 54, such as a curtain assembly with a shade 70, is shown located in a window opening 72. In use, a person activates transmitter assembly 14 by means of controls 42. According to one aspect of the invention, transmitter assembly 14 is manipulated by pressing button 44 and causing shade 70 to move to the fully retracted or up position at the top 74 of window opening 72. Likewise, pressing button 46 causes appliance 54 to lower shade 70 to the fully extended or down position at the bottom 76 of window opening 72. Further, button 48 lowers the shade 70 twenty-five per-cent as shown in FIG. 4. Button 50 lowers shade 70 to the fifty per-cent location 78 and button 52 lowers the shade to the seventy-five per-cent position 80. Obviously, these positions and the appliance described are simply illustrative of the invention and are not meant to limit or restrict the invention to these uses. The controls 42 may also be programmed to provide different functions to single appliances or groups of appliances by means of differing number of button presses, by different length of button presses and differing sequences of button presses.

Figure 5:
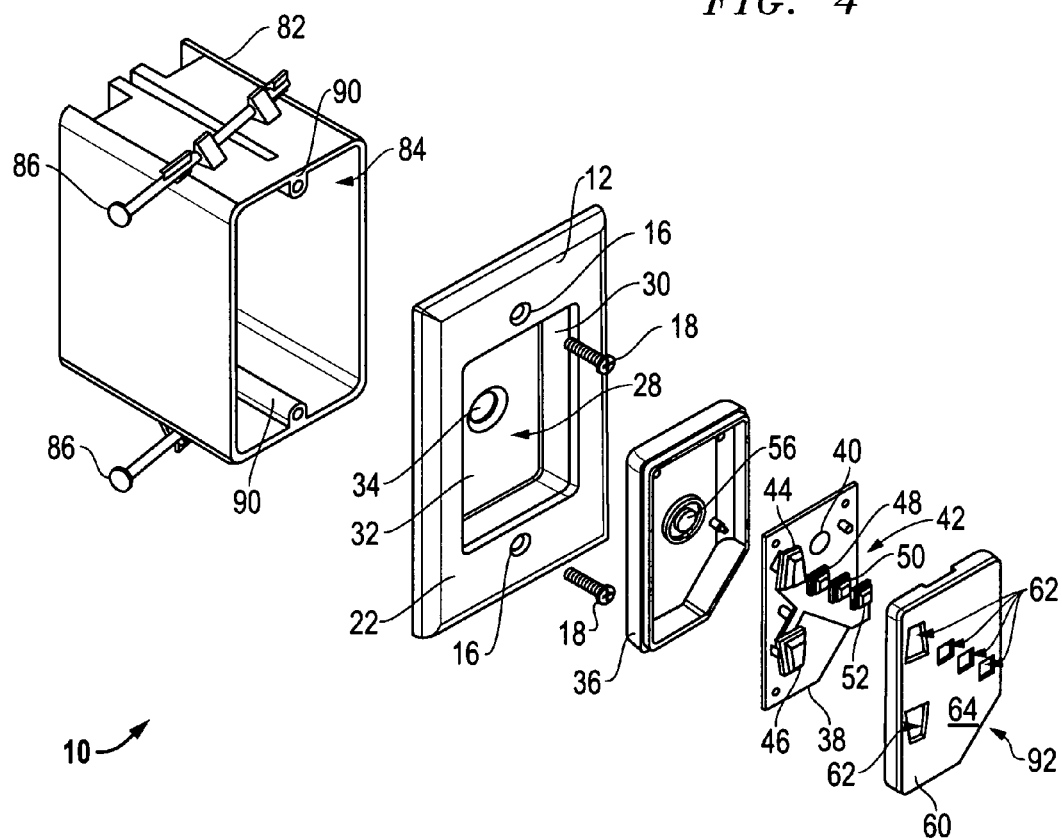
FIG. 5 is an exploded view of another embodiment of the transmitter holder apparatus connected with an electrical switch box and including a remove assist device.

Referring now to FIG. 5, an electrical switch box 82 is shown. Switch box 82 is empty of electrical components normally found therein and contains and opening 84. In normal use, the opening 84 of switch box 82 is located behind wall 66 (not shown). An opening is cut in wall 66 such that access to switch box 82 through opening 84 is provided. Nails 86 are used to connect switch box 82 to wall studs 88 (as shown in FIG. 6). Again, the opening 84 of switch box 82 is facing the back of wall surface 66. Bezel 12 is connected directly with switch box 82 by means of screws 18 screwed into attachment points 90 in switch box 82 such that the front surface 22 of bezel 12 lays flat against wall surface 66 as illustrated in FIG. 6.

According to this embodiment, recess 38 extends beyond the back 26 of bezel 12. Thus, in this embodiment, the recess is deeper and, in fact, the recess 38 extends into and is received by the opening 84 in switch box 82. This results in several advantages. First, if a transmitter assembly is desired to replace a hard wired switch connected to the switch box 82, the user simply disconnects and disables the switch components and then secures bezel 12 directly to switch box 82. This provides the user with increased functionality of a transportable remote while not adding to the clutter of the existing outlet or switch. Further, no re-wiring or new holes need to be made in the wall to make the upgrade. Further, this embodiment enables the transmitter assembly to lay in the same plain as the front surface 22 of bezel 12 as more clearly shown in FIG. 6. Thus an unobtrusive control panel 42 fits flush with the bezel 12 just as if an expensive hard wired system had been installed.

FIG. 5 also illustrates an important element of this embodiment of the invention directed to a remove assist device in the form of cut out 92. Cut out 92 is created by a mismatch of the form of transmitter assembly 14 and bezel 12. As shown here and in FIG. 6, this mismatch is created by eliminating a corner of transmitter assembly 14. Using the cut out 92, a person simply inserts a finger into the cut out 92, grasps the transmitter assembly 14 between thumb and finger and removes it.

Other remove assist devices are available such as a ledge, not shown, in recess 28 against which transmitter assembly 14 tilts such that a user can grasp the transmitter assembly 14 and remove it. Importantly, the required element of the instant remove assist device is that it maintain transmitter assembly 14 and front cover 60 in essentially parallel alignment on the same plane with the front surface 22 of bezel 12.

By way of continued explanation when transmitter assembly 14 is removed from recess 28 re-securing transmitter assembly 14 in place within recess 28 simply requires the user to move the transmitter assembly 14 close enough to recess 28 that the magnetic attraction between metal plate 34 and magnet 56 is great enough to removably attach the them together.

Again, an advantage of the present invention is that with the transmitter assembly 14 removed from bezel 12, a non obtrusive, flat surface is presented. Further, the fact that the transmitter 14 has been removed is easily determined. Still further, the removably attachable feature of the transmitter assembly 14 allows the user to access it for servicing or remote use easily and inexpensively.

Another advantage of the present invention is illustrated in the situation in which the transmitter assembly 14 is connected by the connector device, metal plate 34 and magnet 56 for example only, with the bezel 12. It must be understood, however, that a connector device could be formed by a combination of hook and loop material or any means now known or hereafter developed in place of the magnet and metal combination described herein. Further as illustrated in FIG. 6, recess 28 in bezel 12 in this embodiment is such that when the transmitter assembly 14 is located within the recess 28, the surface 64 of front cover 60 is level with the front surface 22 of bezel 12 which is essentially level with wall surface 66. Thus, an in place device control is provided that is unobtrusive and that presents an essentially flat control panel for operation of desired devices.

A further advantage of the present invention is that it makes use of electrical switch boxes and the familiarity of their location in a structure without requiring any power to be run to the switch box and without requiring a typical switch to be installed. As a result, a user is presented with a fully functional switch at an expected location without the expense of a normal switch. Certainly, the switch box may include power connections that are not used by the present invention but which may be accessed when the owner deems it necessary.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A transmitter holder apparatus comprising:
a) a bezel with a front surface, sides and a flat back wherein the front surface includes a recess;
b) a transmitter assembly wherein the transmitter assembly is configured to fit within the recess in the front surface of the bezel;
c) a connector device for removably connecting the transmitter assembly with the bezel wherein the connector device is asymmetrical such that said transmitter assembly is connected with said bezel in only one particular orientation said connector device includes a male member and a female member wherein said male member is connected with either the transmitter assembly or said bezel and wherein said male member joins with said female member in said bezel or said transmitter assembly in cooperative relationship such that said transmitter assembly and said bezel are removably connected; and wherein the connector device includes a metal plate and a magnet in cooperative relationship such that said magnet removably connects with said metal plate.

2. The apparatus of claim 1 wherein said metal plate is connected with said bezel in the recess and wherein the recess includes a base and the metal plate extends out from said recess base.

3. The apparatus of claim 2 wherein said magnet is connected with said transmitter assembly and wherein said transmitter assembly includes a chamber such that the metal plate fits within the chamber in said transmitter assembly.

4. The apparatus of claim 1 wherein the transmitter assembly includes an operating surface and the operating surface of the transmitter assembly extends above the front surface of the bezel when the transmitter assembly is connected with the bezel.

5. The apparatus of claim 1 wherein said transmitter assembly includes controls for operation of a device in an operating surface of said transmitter assembly.

6. The apparatus of claim 5 wherein the device is a curtain assembly.

7. The apparatus of claim 5 wherein the controls control movement of a curtain assembly such that a shade moves up and down.

8. The apparatus of claim 5 wherein the controls control movement of a curtain assembly such that a shade moves up and down a percentage of a total distance.

9. A transmitter holder apparatus comprising:
a) a bezel with a front surface, sides and a back wherein the front surface includes a recess;
b) a transmitter assembly for operation of an appliance wherein the transmitter assembly includes controls for operation of the appliance and wherein said transmitter assembly includes a power source and wherein the transmitter assembly is configured to fit within the recess in the front surface of the bezel;
c) a connector device for removably connecting the transmitter assembly with the bezel wherein the connector device includes a male member and a female member wherein said male member includes either a metal plate or a magnet connected with either the transmitter assembly or said recess of said bezel and wherein said male member includes either a magnet or a metal plate and joins with said female member in said bezel or said transmitter assembly in cooperative relationship such that said transmitter assembly and said bezel are removably connected and wherein the connector device is located in an asymmetrical location within said recess such that said transmitter assembly is connected with said bezel in only one particular orientation.

10. The apparatus of claim 9 wherein said recess in the front surface of the bezel extends beyond the back of the bezel.

11. The apparatus of claim 10 wherein said recess in the bezel is conformed to fit within an electrical switch box.

12. The apparatus of claim 9 wherein the appliance is a curtain assembly and wherein the curtain assembly includes a shade for covering an opening and wherein the controls control operation of the curtain assembly such that the shade moves up to an upper limit and down to a lower limit.

13. The apparatus of claim 9 wherein the appliance is a curtain assembly and wherein the curtain assembly includes a shade for covering an opening and wherein the controls include a first control, a second control and a third control and wherein the first control controls movement of the curtain assembly such that approximately twenty-five per-cent of an opening is covered by the shade, wherein said second control controls movement of the curtain assembly such that approximately fifty per-cent of an opening is covered by the shade and wherein said third control controls movement of the curtain assembly such that approximately seventy-five per-cent of an opening is covered by the shade.

14. The apparatus of claim 9 wherein the connector device is asymmetrical such that said transmitter assembly is always connected with said bezel in only one particular orientation.

15. A transmitter holder method for utilizing a transmitter comprising:
   a) providing a bezel with a front surface, sides and a flat back wherein the front surface includes a recess; providing a transmitter assembly for operation of an appliance wherein said transmitter assembly includes controls for operation of the appliance and wherein said transmitter assembly includes a power source and wherein said transmitter assembly is configured to fit within said recess in the front surface of the bezel; providing a connector device for removably connecting the transmitter assembly with the bezel wherein the connector device includes a metal plate and a magnet in cooperative relationship such that said magnet removably connects with said metal plate wherein the connector device is in an asymmetrical location in said recess such that said transmitter assembly is connected with said bezel in only one particular orientation; and
   b) placing the transmitter assembly with said bezel such that said metal plate and said magnet hold said transmitter assembly in connection with said bezel.

16. The method of claim 15 wherein said metal plate is connected with said bezel and said magnet is connected with said transmitter assembly.

17. The method of claim 15 wherein the appliance is a curtain assembly and wherein the curtain assembly includes a shade for covering an opening and wherein the controls control operation of the curtain assembly such that the shade moves up to an upper limit and down to a lower limit.

18. The method of claim 15 wherein the appliance is a curtain assembly and wherein the curtain assembly includes a shade for covering an opening and wherein the controls include a first control, a second control and a third control and wherein the first control controls movement of the curtain assembly such that approximately twenty-five per-cent of an opening is covered by the shade, wherein said second control controls movement of the curtain assembly such that approximately fifty per-cent of an opening is covered by the shade and wherein said third control controls movement of the curtain assembly such that approximately seventy-five per-cent of an opening is covered by the shade.

\* \* \* \* \*